(12) United States Patent
Skarin et al.

(10) Patent No.: US 10,421,562 B2
(45) Date of Patent: Sep. 24, 2019

(54) SYSTEM FOR FILLING AND PACKING TETRAHEDRAL PACKAGES

(71) Applicant: TETRA LAVAL HOLDINGS & FINANCE S.A., Pully (CH)

(72) Inventors: Lars Skarin, Uddevalla (SE); Magnus Danielson, Grebbestad (SE); Hans Gustafsson, Uddevalla (SE); Fredrik Olsson, Tanumshede (SE); Marten Andersson, Malmö (SE)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 467 days.

(21) Appl. No.: 15/102,783

(22) PCT Filed: Dec. 1, 2014

(86) PCT No.: PCT/EP2014/076128
§ 371 (c)(1),
(2) Date: Jun. 8, 2016

(87) PCT Pub. No.: WO2015/086362
PCT Pub. Date: Jun. 18, 2015

(65) Prior Publication Data
US 2016/0311563 A1   Oct. 27, 2016

(30) Foreign Application Priority Data

Dec. 9, 2013   (SE) ..................... 1351471

(51) Int. Cl.
*B65B 5/08*     (2006.01)
*B65B 35/38*    (2006.01)
(Continued)

(52) U.S. Cl.
CPC ............. *B65B 5/08* (2013.01); *B65B 35/38* (2013.01); *B65B 35/44* (2013.01); *B65B 35/54* (2013.01);
(Continued)

(58) Field of Classification Search
CPC .......... B65B 5/08; B65B 25/00; B65B 35/36; B65B 35/44; B65B 35/54; B65B 35/56; B65B 61/205; B65D 85/542
(Continued)

(56) References Cited

U.S. PATENT DOCUMENTS 2,908,125 A * 10/1959 Valdemar .................. B65B 5/08
                                                                 53/142
3,108,678 A * 10/1963 Schie ..................... B65G 47/52
                                                                 198/409
(Continued)

FOREIGN PATENT DOCUMENTS

CH          356 075 A       7/1961
JP       S48-089092 A      11/1973

OTHER PUBLICATIONS

International Search Report (PCT/ISA/210) dated Apr. 10, 2015, by the European Patent Office as the International Searching Authority for International Application No. PCT/EP2014/076128.
(Continued)

*Primary Examiner* — Hemant Desai
*Assistant Examiner* — Veronica Martin
(74) *Attorney, Agent, or Firm* — Buchanan Ingersoll & Rooney PC (57) ABSTRACT

A system for packing a flow of first and second mirrored, irregular tetrahedral packages, each package has two sealed fins, two isosceles right triangle panels and two elongated right triangle panels, where the two isosceles right triangle panels share a leg, and the two elongated right triangle panels share a hypotenuse. The system includes a divider, conveyor, first packing carrier, a first robot picker, a second package carrier and a second robot picker.

10 Claims, 11 Drawing Sheets

(51) Int. Cl.
| | |
|---|---|
| B65B 35/44 | (2006.01) |
| B65B 35/54 | (2006.01) |
| B65B 35/56 | (2006.01) |
| B65B 61/28 | (2006.01) |
| B65B 61/20 | (2006.01) |
| B65B 65/00 | (2006.01) |
| B65G 47/91 | (2006.01) |
| B65B 9/20 | (2012.01) |

(52) U.S. Cl.
CPC ............ B65B 35/56 (2013.01); B65B 61/205 (2013.01); B65B 61/28 (2013.01); B65B 65/003 (2013.01); B65B 9/2056 (2013.01); B65B 2220/18 (2013.01); B65G 47/91 (2013.01); B65G 2201/0214 (2013.01); B65G 2201/0261 (2013.01)

(58) Field of Classification Search
USPC .......... 206/436; 53/493, 495, 142, 143, 235, 53/251, 133.1; 198/867.1, 867.11, 198/803.11, 803.13, 803.14
See application file for complete search history.

(56) References Cited

U.S. PATENT DOCUMENTS

| | | | | |
|---|---|---|---|---|
| 3,282,024 | A * | 11/1966 | Anderson | B65B 5/105 53/142 |
| 3,347,363 | A * | 10/1967 | Dykes | B65D 75/50 206/436 |
| 3,396,507 | A | 8/1968 | Morris et al. | |
| 3,495,377 | A | 2/1970 | Delme | |
| 3,916,600 | A * | 11/1975 | Falt | B65B 5/00 53/142 |
| 3,964,617 | A * | 6/1976 | Pettersson | B65B 5/108 53/142 |
| 4,932,427 | A * | 6/1990 | Yamada | B65G 49/0459 118/423 |
| 4,969,308 | A * | 11/1990 | Hakansson | B65B 61/205 53/133.1 |
| 5,979,142 | A * | 11/1999 | Kraft | B65B 61/205 53/410 |
| 6,526,725 | B1 * | 3/2003 | Williams | B65B 61/205 493/379 |
| 7,918,718 | B2 * | 4/2011 | Christensen | A22B 5/007 452/157 |
| 9,790,037 | B2 * | 10/2017 | Gazzola | B65D 5/6664 |
| 2006/0070859 | A1 * | 4/2006 | Pahlow | B65G 15/10 198/809 |
| 2010/0300040 | A1 * | 12/2010 | Lindback | B65B 61/205 53/133.1 |
| 2012/0192526 | A1 * | 8/2012 | Spix | B65B 25/065 53/396 |
| 2013/0133292 | A1 * | 5/2013 | Ford | B65B 9/042 53/452 |

OTHER PUBLICATIONS

Written Opinion (PCT/ISA/237) dated Apr. 10, 2015, by the European Patent Office as the International Searching Authority for International Application No. PCT/EP2014/076128.

Office Action (Notification of Reasons for Refusal) dated Oct. 16, 2018, by the Japanese Patent Office in corresponding Japanese Patent Application No. 2016-537451 and an English Translation of the Office Action. (6 pages).

* cited by examiner

SYSTEM FOR FILLING AND PACKING TETRAHEDRAL PACKAGES

TECHNICAL FIELD

The present invention relates to a system for filling and packing tetrahedral packages produced from a tube of packing material for a liquid food product, and in particular how a transport system, such as conveyers and carriers, are configured for handling and packing irregular tetrahedral packages.

BACKGROUND ART

Tetrahedral packages have been manufactured and distributed for many years, and Tetra Pak® has been developing such systems since 1950. However, normal tetrahedral packages have a drawback, since they are difficult to pack in a space-convenient way. Specific odd-shaped secondary boxes for packing such tetrahedral packages have been developed for handling transport and shipping. Such odd-shaped boxes are not only costly but also complicate the packing process in automatic lines.

The general shape of an irregular tetrahedron, and its mirrored version, that can be used to completely fill a cube has been known since at least the year 1900. In U.S. Pat. No. 3,347,363 an irregular tetrahedral package was disclosed which enabled tight packing within a cube. The general idea is that a cube can be filled completely by using a combination of irregular tetrahedrons and tetrahedrons with a mirrored shape thereof. An internet search of space-filling tetrahedrons reveals different possible packing patterns. However, the irregular tetrahedrons are not easy to assemble into a cube since neither the intermediate nor the final assembly is stable in itself. There is hence a need for additional support.

Swedish patent application no. 1350503-7 discloses a method for assembling a group of irregular tetrahedral packages having a first orientation and a mirrored second orientation. The method comprises the steps of providing an L-shaped blank having a rectangular central wall, a rectangular right wall and a rectangular left wall, arranging one tetrahedral package with a first orientation and one tetrahedral with a second orientation on each of the right wall, left wall and central wall, such that the cardboard blank can be folded into a cube by angling the right wall from an unfolded position and by angling the left wall from an unfolded position until the tetrahedral packages rest on top of the tetrahedral packages on the central wall. Thus, a cube has been produced of six tetrahedral packages. In preferred embodiments an adhesive is applied to the tetrahedral packages on the sides that abut sides of other tetrahedral packages in order to further increase the stability during packing. The method disclosed in the Swedish patent application no. 1350503-7 has, despite the fact that the irregular tetrahedrons are not stable during the intermediate or the final assembly thereof, found a way to overcome the problem by introducing the L-shaped blank.

However, there is still room for improvements when it comes to packing irregular tetrahedral packages into a cube shape. More specifically there is a need to for a system for filling and packing tetrahedral packages without the use of any intermediate blanks, adhesives or the like for creating stability during the packing process.

SUMMARY OF THE INVENTION

It is hence an object of the present invention to alleviate or mitigate at least some of the problems of the prior art, by introducing a system for packing tetrahedral packages produced from a tube of packing material for a liquid food product. The system comprises a filling machine for filling the tube of packing material with the liquid food product and sealing said tube in such a way that two types of tetrahedral packages being minor images of each other are created. The filling machine is furthermore configured to divide the tetrahedral packages into two flows based on the type of package. Moreover the system comprises conveyor means for transporting the tetrahedral packages from the filling machine to a packing station, a first packing carrier having a first base plate and three side supports projecting approximately 90° from said first base plate and which are adapted to support both types tetrahedral packages, a first robot picker having a first lifting device adapted to simultaneously pick the two different types of tetrahedral packages, a second package carrier having a second base plate and six side supports projecting approximately 90° from said second base plate and which are adapted to receive six tetrahedral packages in such away that they are grouped together to form a cube when placed in the second package carrier, and a second robot picker having a second lifting device adapted to simultaneously lift the six grouped together tetrahedral packages.

In one embodiment of the present invention the conveyor means of the system have an essentially V-shaped form, in which the bottom of the V has an opening and the system further comprises a straw application machine with a straw applicator for fastening a straw onto the tetrahedral packages from below the V-shaped conveyer means through the opening.

In yet another embodiment of the system, a first and a second side support of the three side supports are arranged such that they form a V-shape seen from above in a direction of 90° from said first base plate. The V-shape is open in the bottom region of the V-shape and a third side support is placed in the middle between the first and second side support. There may furthermore be a supporting bar arranged parallel to the first base plate, which connects to all three side supports in the upper region of said V-shape. The third side support may also be tapered in such a way that the side closest to the bottom of the V-shape is lower then the side closest to the top of the V-shape.

In a further embodiment of the system the six side supports of the second package carrier are equidistantly distributed in a fan shaped manner seen from above in a direction of 90° from said second base plate, such that two adjacent side supports form a V-shape, which V-shape is open in the bottom region of the V-shape. The second package carrier may also be provided with intermediate side supports that are positioned in the middle between two adjacent side supports. Also the intermediate side supports may be tapered, such that the side closest to the bottom of the V-shape is lower then the side closest to the top of the V-shape. Thus, the present invention has been described by way of different exemplary embodiments.

BRIEF DESCRIPTION OF THE DRAWINGS

These and other aspects, features and advantages of which the invention is capable of will be apparent and elucidated from the following description of embodiments of the present invention, reference being made to the accompanying drawings in which.

DETAILED DESCRIPTION

In the following description, for purposes of explanation and not limitation, specific details are set forth, such as particular components, elements, techniques, etc. in order to provide a thorough understanding of the exemplifying embodiments. However, it will be apparent to one skilled in the art that the exemplifying embodiments may be practiced in other manners that depart from these specific details. In other instances, detailed descriptions of well-known methods and elements are omitted so as not to obscure the description of the example embodiments. The terminology used herein is for the purpose of describing the example embodiments and is not intended to limit the embodiments presented herein.

Prior to the description of embodiments of the present invention the type of tetrahedrons that are packed into a cube will be described more thoroughly.

Figure 1:
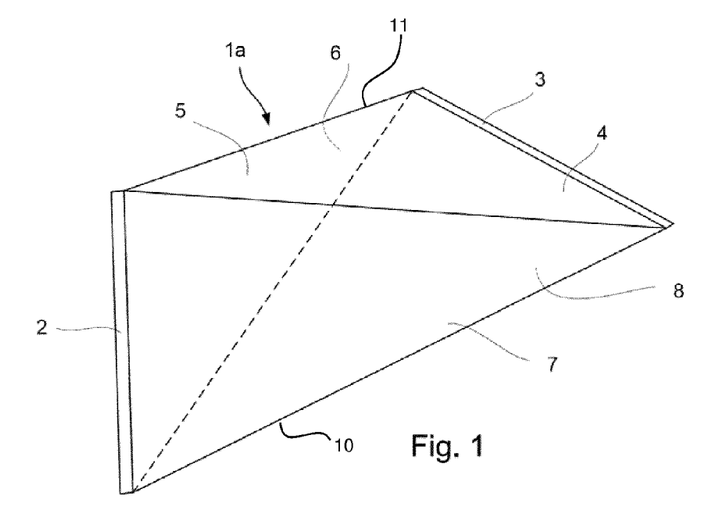
FIG. 1 shows a perspective view of an irregular tetrahedron that together with other irregular tetrahedrons is packable into a cube.

FIG. 1 shows a perspective view of an irregular tetrahedron or tetrahedral package that together with other irregular tetrahedrons is packable into the cube. One such first tetrahedral package 1a can be seen in FIG. 1. A mirrored version, denoted second tetrahedral package, 1b thereof must also be used in order to completely fill a cube, see FIG. 2. The package 1a, 1b comprises two sealed fins 2, 3 and has a body 4 that can be filled with a product, such as powder, small articles or a liquid. If the packed product is a perishable liquid food, the package 1a, 1b is preferably of a known kind, comprising a carton core, an aluminium barrier foil layer (or similar) and outer coatings of polymeric material, such as low density polyethylene (LDPE). Such packaging material has been used for many years in the carton food industry, e.g. by Tetra Pak®.

The package 1a has four panels, two panels 5, 6 that are isosceles right triangles, and two elongated panels 7, 8 that are right triangles. The two isosceles panels 5, 6 share a leg 11, and the two elongated right triangles 7, 8 share a hypotenuse 10. The first sealed fin 2 is formed along the edge between the elongated right triangle 7 and the isosceles right triangle 6. The second sealed fin 3 is formed along the edge between the elongated right triangle 8 and the isosceles right triangle 6. The package 1b has the same shape of the panels 5, 6, 7, 8, but their orientation is mirrored. Hence, a package 1b (seen in FIG. 2) has four panels, two panels that are isosceles right triangles, and two elongated panels 7', 8' that are right triangles. The two isosceles panels, of which only one 5' is shown, share a leg 11', and the two elongated right triangles 7', 8' share a hypotenuse 10'.

Figure 2:
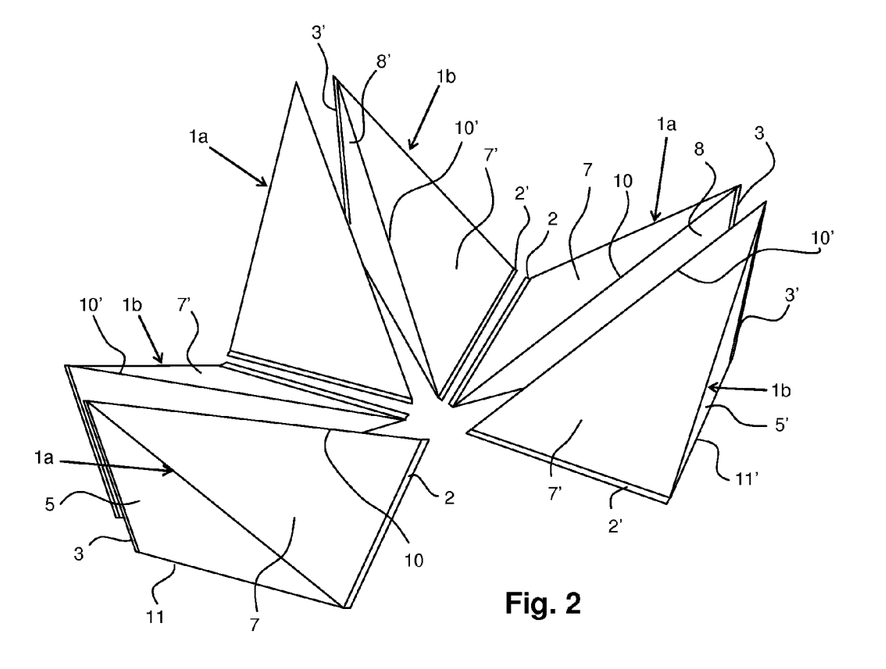
FIG. 2 shows a perspective view of six tetrahedrons which together may be shaped into a cube.

FIG. 2 shows a perspective view of six tetrahedrons which together may be shaped into the cube. Of the six irregular tetrahedral packages 1a, 1b three are orientated in one direction and the other three are mirrored versions. In prior art, such as in Swedish patent application no. 1350503-7 the packages 1a, 1b may be attached to a blank of cardboard with the use of some adhesive, such as hot-melt glue or double-sided tape. Such a blank is then folded to bring the tetrahedral packages on the right hand side and on the left hand side of FIG. 2 on top of the tetrahedral packages 1a, 1b and a cube will be formed. According to the present invention the same type of cube as in Swedish patent application no. 1350503-7 will be created but without the use of any blanks or adhesives.

Figure 13:
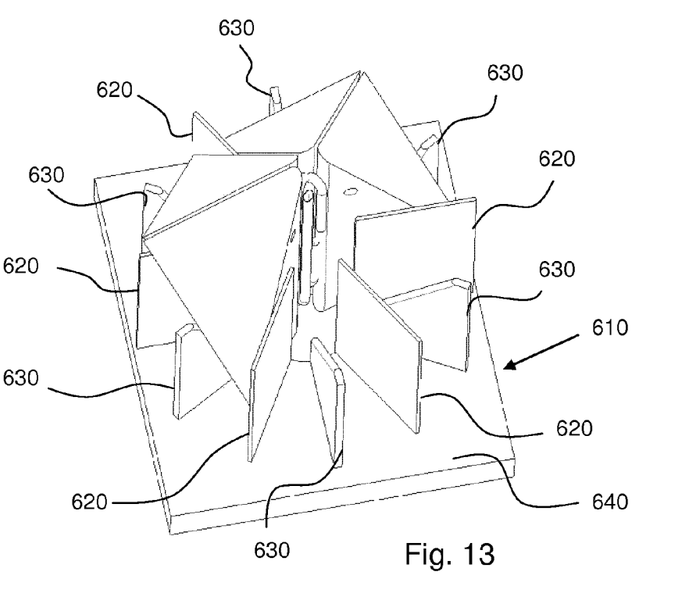
FIGS. 13-14 show a perspective view of a second carrier, partly and completely filled with irregular tetrahedrons.
Figure 17:
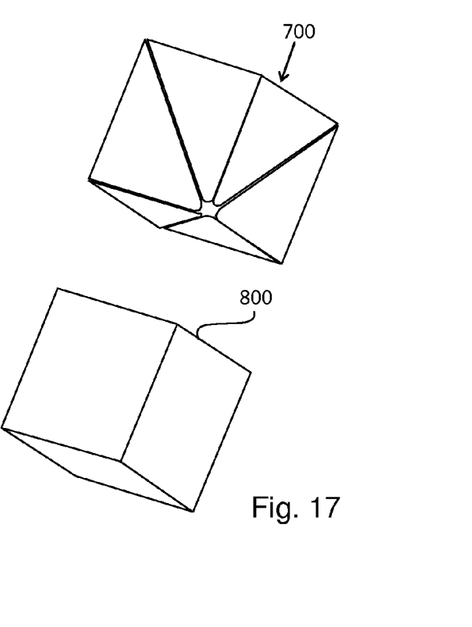
FIG. 17 shows how six tetrahedral packages are grouped to create a cube together with a secondary package into which the cube may be put.

Upon formation of a cube 700, see FIG. 17, the hypotenuses 10, 10' of the elongated panels 7, 8, 7', 8' of the six packages will be aligned with each other, i.e. aligned along a common centre axis a (see FIG. 13).

Figure 3:
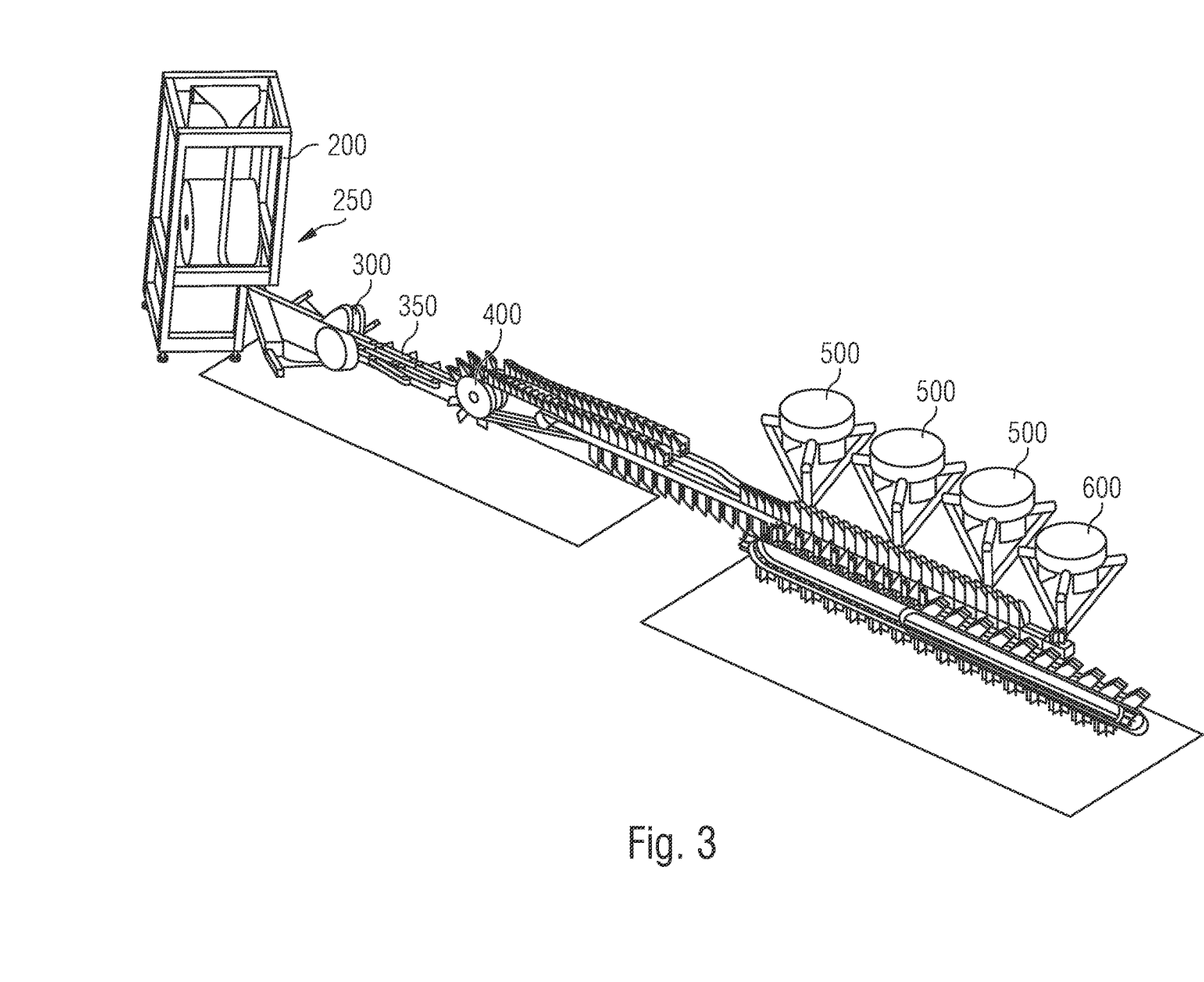
FIG. 3 shows a general view of a system for filling and packing tetrahedral packages according to a preferred embodiment of the present invention.

FIG. 3 shows a general view of a system for filling and packing tetrahedral packages according to one embodiment of the present invention. Such a system comprises a filling machine 200, a straw application machine 300, a switch station 400, first robot pickers 500 and a second robot picker 600. The system also comprises different conveyer means for transporting the tetrahedral packages 1a, 1b between the different stations and machines. In FIG. 3, V-conveyer means are arranged between the straw application machine 300 and the switch station 400. Such V-conveyer means 350 may also be arranged between the filling machine 200 and the straw application machine 300. In FIG. 3 the filling machine 200 is connected directly to the straw application machine 300, and the V conveyor means goes from the filling machine, through the straw applicator and up to the switch station 400. As is understood by a person skilled in the art there are many different ways to configure a filling and packing system and many different combinations are envisioned. For example if there is no need for straws on the packages the straw application machine 300 may be omitted. The focus of the present invention is the way to transport and pack the irregular tetrahedrons into a cube.

Figure 18:
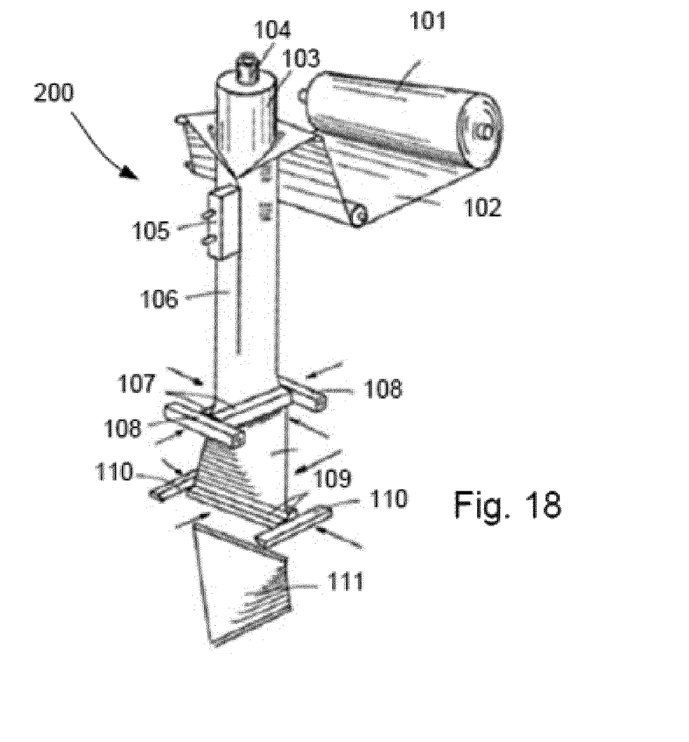
FIG. 18 shows a perspective view of a filling machine according to prior art.

Filling machines 200 for producing tetrahedral packages have been well described in prior art, the principles of which will now be described shortly. FIG. 18 shows a perspective view of a filling machine according to prior art. In FIG. 18, a conceptual filling machine 200 for producing tetrahedral packages is shown. In the machine 200, a reel 101 of packaging material is provided on a bobbin, and the packaging material is fed out as a continuous web 102 of flat packaging material. The packaging material is directed around a mandrel 103, through which a pipe 104 is also provided. The mandrel helps shape the web of packaging material into a tube 106 of packaging material, and the opposite edges of the web 102 of packaging material are overlapping and are sealed together by a longitudinal sealing unit 105. This is either a hot-air nozzle, which heats the opposite edges with warm sterile air, or is an inductor that heats the opposite edges of the packaging material by inducting a current in the aluminium foil, through the generation of a high-frequency magnetic field. The inside edge of packaging material is provided with a plastic strip, in order to cover the inner carton core of the packaging material. This is normally performed at an earlier stage, before the tube forming. After the longitudinal sealing, the entire inner surface is covered by polymeric material. The now sealed tube of packaging material is filled with a liquid food product coming through pipe 104. The filling level of the tube 106 can be monitored by having a floater inside tube 106, e.g. attached to the outside of the filling pipe, or it can be monitored by a free floating object whose position is detected from the outside. The filled tube of packaging material is now transversally sealed by the sealing jaws. In FIG. 18, the upper sealing jaws 107 are brought into contact with the tube 106 of packaging material, and have hence flattened said tube. The heat generated by the heating jaws 107 (either by direct heating or by induction heating) heats up the polymeric material on the inside of the tube 106, and the pressure from the sealing jaws 107 make the inside surfaces adhere to each other. Downstream from the first sealing jaws 107, sealing jaws 109 can be seen in contact with the tube 106. As can be seen in FIG. 18, the sealing jaws 109 create a transversal sealing that is orthogonal to the transversal sealing created by sealing jaws 107. The package that is shaped between sealing jaws 107 and 109 is tetrahedral, having a top fin and a bottom fin that are orthogonal to each other. In operation, the sealing jaws 107, 109 are moved downward, feeding more packaging material to the mandrel and to the tube-forming section. The sealing jaws 107 are then replaced by sealing jaws 108, which operate in a direction that is orthogonal to the direction that the sealing jaws 107 operate. Sealing jaws 110 are also indicated at the position where the sealing jaws 109 operate, and sealing jaws 110 operate in a direction that is orthogonal to the direction that sealing jaws 108 operate. In this way, alternate transversal sealings are performed that are orthogonal to each other. The sealing jaws 107-110 are all further orthogonal to the longitudinal direction of the tube of packaging material. Today, the tube forming of the packaging material is normally performed by having several forming rings, gradually shaping the flat web into a tube by acting on the outside of the packaging material, rather than having an inner mandrel, acting on the inside of the packaging material. Thus, the basic principles for the filling machine 200 have been described.

For a better understanding of how the irregular tetrahedrons 1a, 1b, to be packed by the present invention, are manufactured reference is made to Swedish patent application no. 1350404-8.

Figure 4:
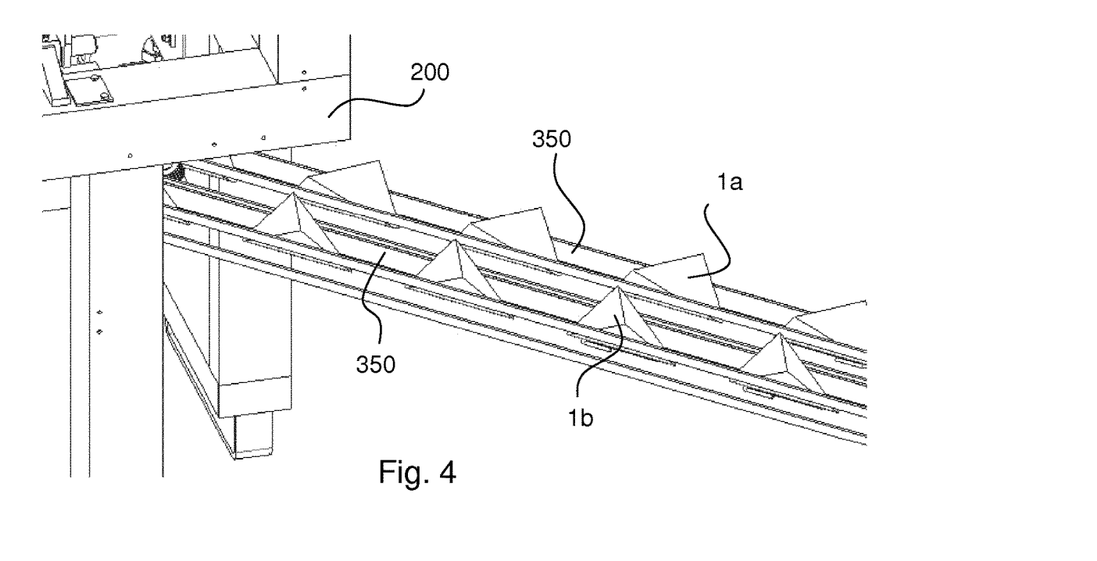
FIG. 4 shows a perspective view of an outgoing flow from a filling machine.

Turning now to FIG. 4 the outgoing flow from the filling machine 200 will be described. After manufacturing and filling the irregular tetrahedral packages 1a and 1b in the filling machine 200 the tetrahedral packages 1a and 1b will be divided into two different flows by a divider 250 and further transported by V-conveyer means 350. The flow is divided such that all tetrahedral packages of one type belong to the same flow and the mirror imaged tetrahedral packages belong to another flow. There are many ways to divide the tetrahedral packages into two flows depending of which type they belong to. The packages may for example be provided with barcodes or QR-codes and a bar code reader or QR-reader may be used to sort the tetrahedral packages. Another solution may be to include magnetizable particles, such as magnetite, in the packaging material and use a detector to detect the type of tetrahedral package. It is also possible to use a simple mechanical sorting mechanism close to the outfeed of the filling machine, which diverts one type of packages (1a) in one direction, and the other type of packages (1b) in another direction. As realised by a person skilled in the art, these are just a few of the options available to solve the sorting problem.

Figure 5:
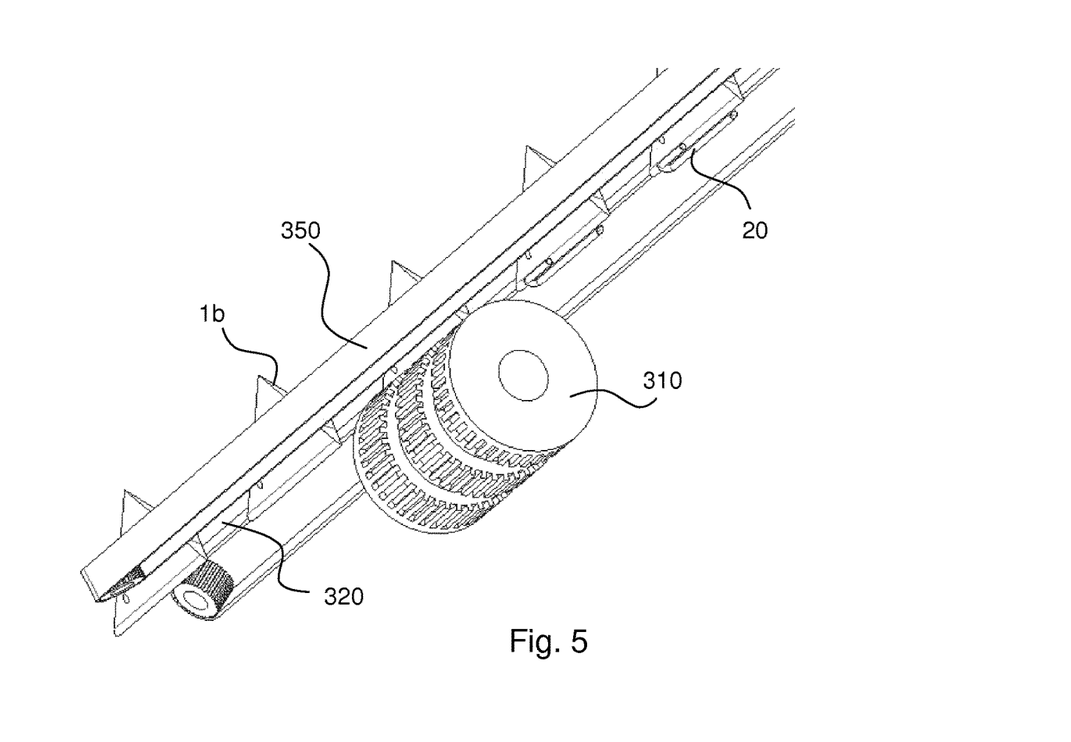
FIG. 5 shows a perspective view of a straw applicator for applying a straw from beneath the conveyer means on which the tetrahedrons are transported.

FIG. 5 shows a perspective view of a straw applicator 310 for applying a straw 20 from beneath the conveyer means 350 on which the tetrahedrons 1b are transported. As mentioned above the use of a straw application machine 300 is optional and may be connected directly to the filling machine 200 as in FIG. 3 or by using V-conveyer means 350 between the filling machine 200 and the straw application machine 300 as is shown in FIG. 4 and FIG. 5. In FIG. 5 it is clearly seen that the straw 20 is applied from below. For that purpose the V-conveyer means 350, which have an essentially V-shaped form, have an opening 320 at the bottom of the V. The straw 20 is applied trough the opening 320. Furthermore, the straw applicator 310 may be rotatable 180° such that it always may place the straw 20 in the same way even if the tetrahedral packages are of different types. In order to identify the type of tetrahedral package the straw application machine 300 may further comprise an identification unit for identifying the type of tetrahedral package 1a, 1b and apply the straw 20 in response to the identified type of tetrahedral package 1a, 1b.

Figure 6:
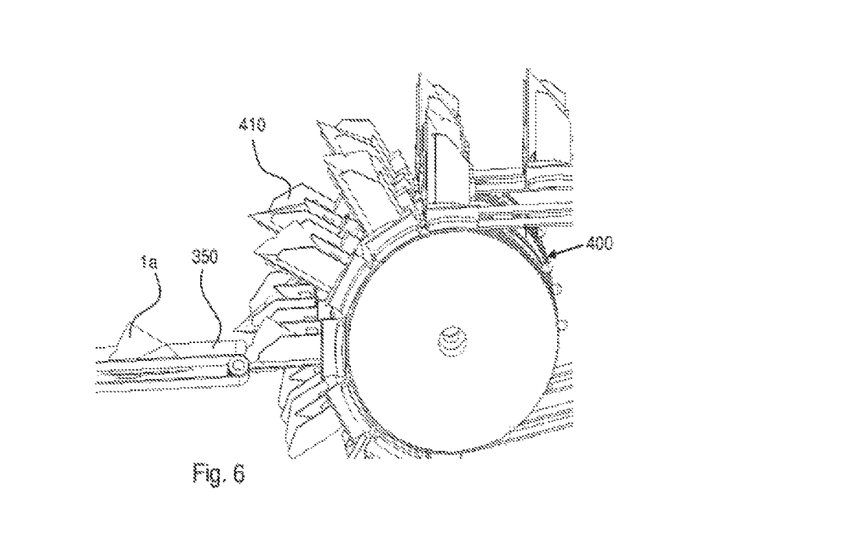
FIG. 6 shows a close-up perspective view of an assembly for moving the tetrahedral packages from V-conveyer means to a first carrier.
Figure 7:
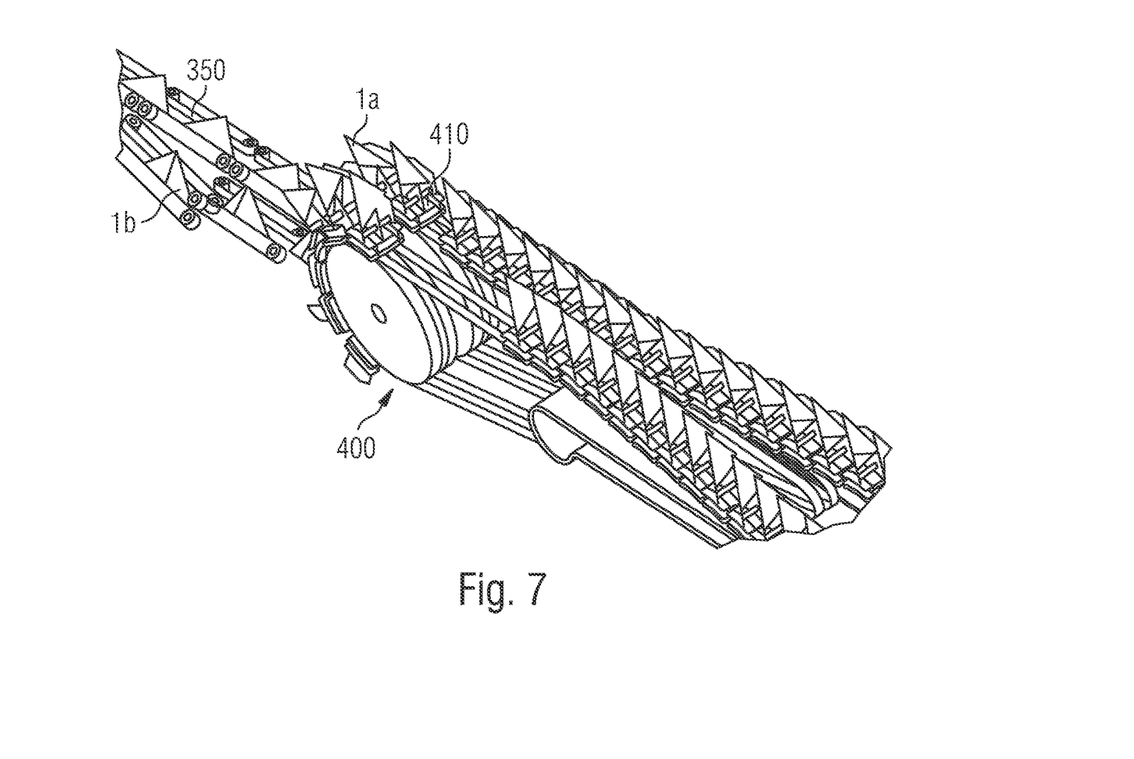
FIG. 7 shows a perspective overall view of the assembly for moving the tetrahedral packages from the V-conveyer means to the first carrier.

FIG. 6 and FIG. 7 show a close-up and an overall perspective view, respectively, of a switch station 400 assembly for moving the tetrahedral packages 1a, 1b from the V-conveyer means 350 to a first carrier 410. The first carrier 410 will be described in more detail in conjunction with FIGS. 8a-f. The switch station 400 is used to change means of transportation for the tetrahedral packages 1a and 1b from the V-conveyer means 350 to the first package carrier 410. As is evident from FIG. 6 and FIG. 7 the tetrahedral packages 1a and 1b will slide into the first package carrier 410, which is in a "lying" position, from the V-conveyer means 350. The first package carrier 350 will then be rotated into an upright position and further transported to a packing station. It is also conceivable that the packages 1a, 1b fall directly from the filling machine into the first package carrier 410, through some slide unit (not shown).

Figure 8A:
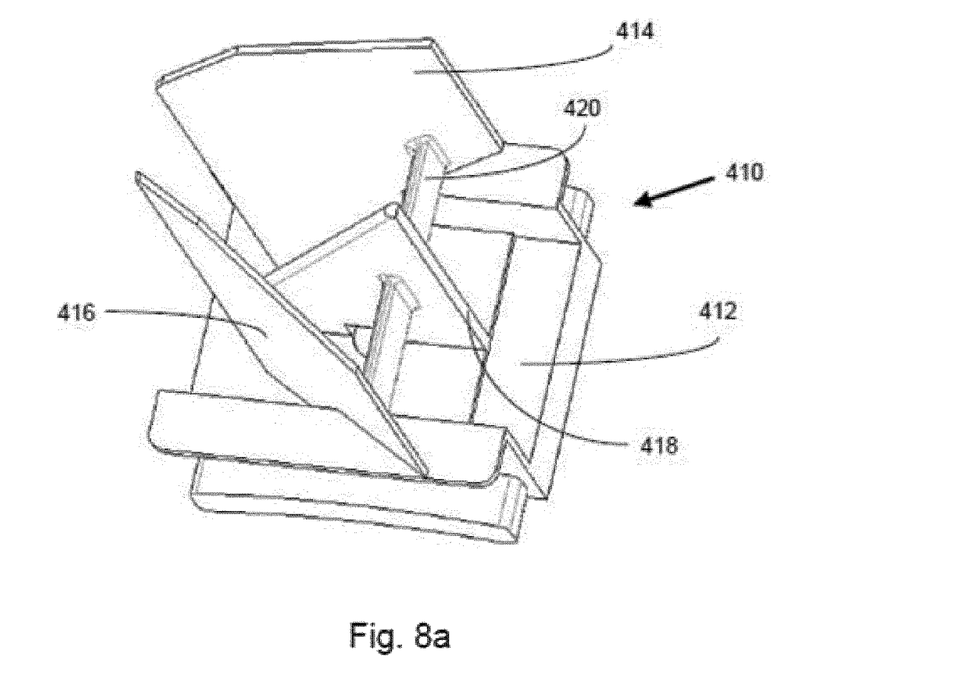
FIGS. 8a-8f are different perspective views of the first carrier, both when it is empty and when it is carrying a tetrahedron.
Figure 8B:
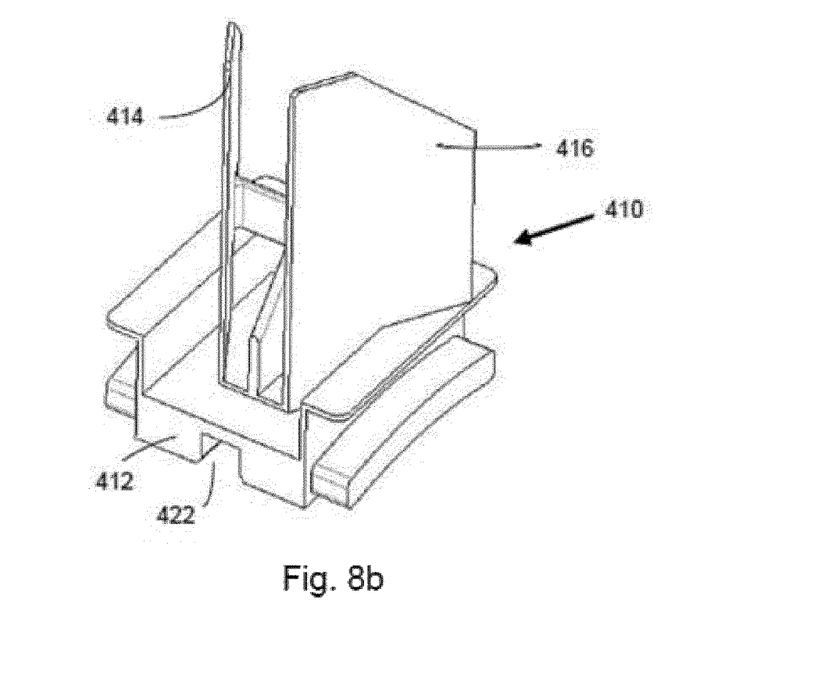
Figure 8C:
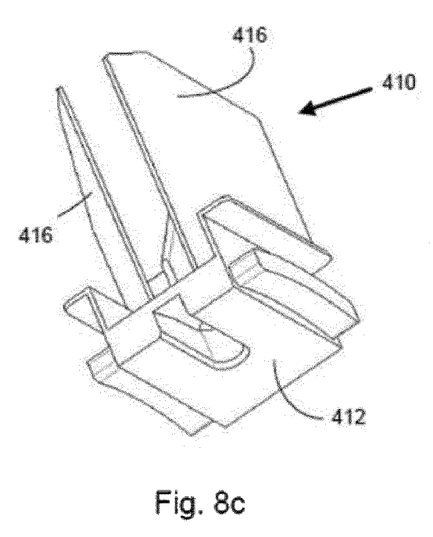
Figure 8D:
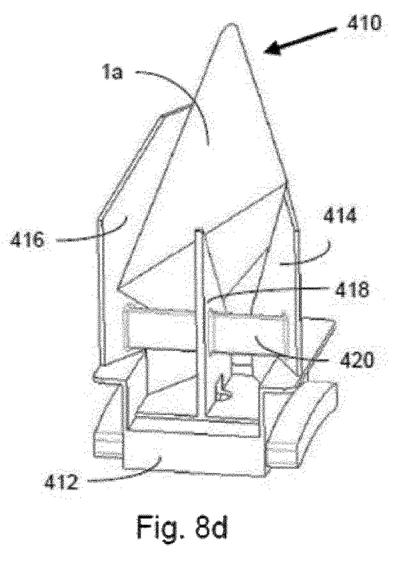
Figure 8E:
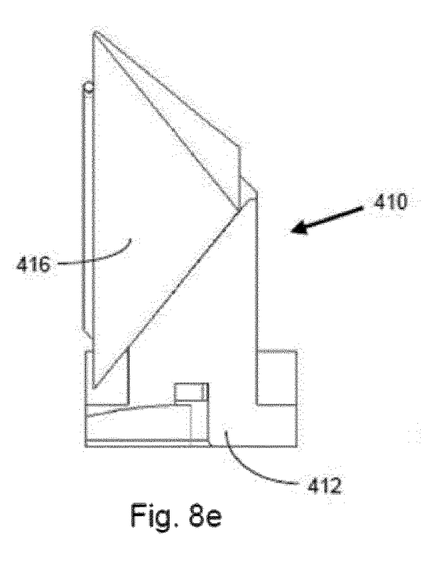
Figure 8F:
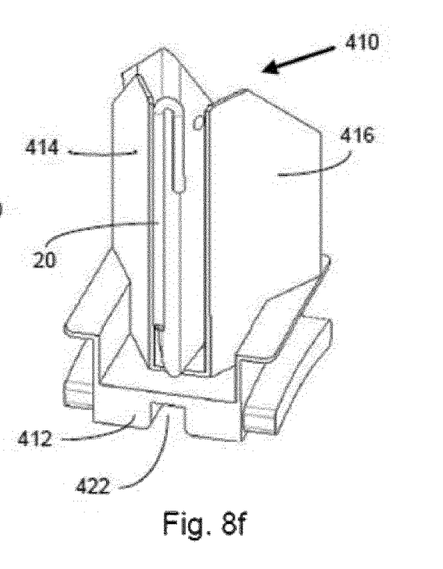

With reference to FIGS. 8a-8f, which show different perspective views of the first carrier 410, both when empty and when carrying a tetrahedron, the first package carrier 410 will be described in detail. The first package carrier 410 comprises a first base plate 412 and a first, second and third side support 414, 416, 418 projecting approximately 90° from the first base plate 412. The first 414 and a second 416 side support are arranged such that they form a V-shape seen in a direction of 90° from above the first base plate. The V-shape is open in the bottom region of the V-shape and the third side support 418 is placed in the middle between the first and second side support 414, 416. There is furthermore a supporting bar 420, which is arranged parallel to the first base plate 412 and is connected to all three side supports 414, 416, 418 in an upper region of said V-shape. The geometry of said first package carrier 410 is adapted to carry and support both types of tetrahedral packages 1a, 1b. How a tetrahedral package is carried is best shown in FIG. 8d. As can be seen in FIG. 8d the first side support 414 supports one side of the tetrahedral package 1a and the second side support 416 supports another side of the tetrahedral package 1a. A third side of the tetrahedral package 1a rests on the third side support 418, which for that purpose is adapted to the shape of the tetrahedron, i.e. the upper end of the third side support 418 is tapered, such that the side closest to the bottom of the V-shape is lower then the side closest to the top of the V-shape. It is important that the tetrahedrons are kept in the same stable position when they are to be picked and subsequently packed, which will be described in more detail below. The design also allows that the first package carrier 410 carries tetrahedral packages of different sizes due to the tapering of the third side support 418. Thus, with the first package carrier 410 it is possible to carry tetrahedral packages with different volumes such as 65 ml, 150 ml and 200 ml without any need to redesign the package carrier 410. Furthermore, the first package carrier 410 also comprises a recess 422 in the bottom of the first base plate 412. This recess is adapted to the conveyer means that transport the first package carrier 410 and may be shaped accordingly. It is also possible to apply a straw 20 to the tetrahedron when it is carried by the first package carrier 410, since the bottom of the V-shape is open, which may be best seen in FIG. 8f. When the tetrahedral packages 1a, 1b are transported in the V-conveyor, the long diagonal of the packages are facing downwards, according to one aspect of the invention. Similarly, when the tetrahedral packages are transported in the first package carrier 410, the long diagonal of the packages are facing the open end of the V, according to another aspect of the invention. This may facilitate the application of straws onto said long diagonal of the packages 1a, 1b.

The first package carrier 410 can either be clamped to the conveyor means, by using the specially designed features of the bottom, or may be free-standing on a regular belt conveyor or flexible plastic conveyors. This enables queueing of package carriers 410 for accumulation.

Figure 9:
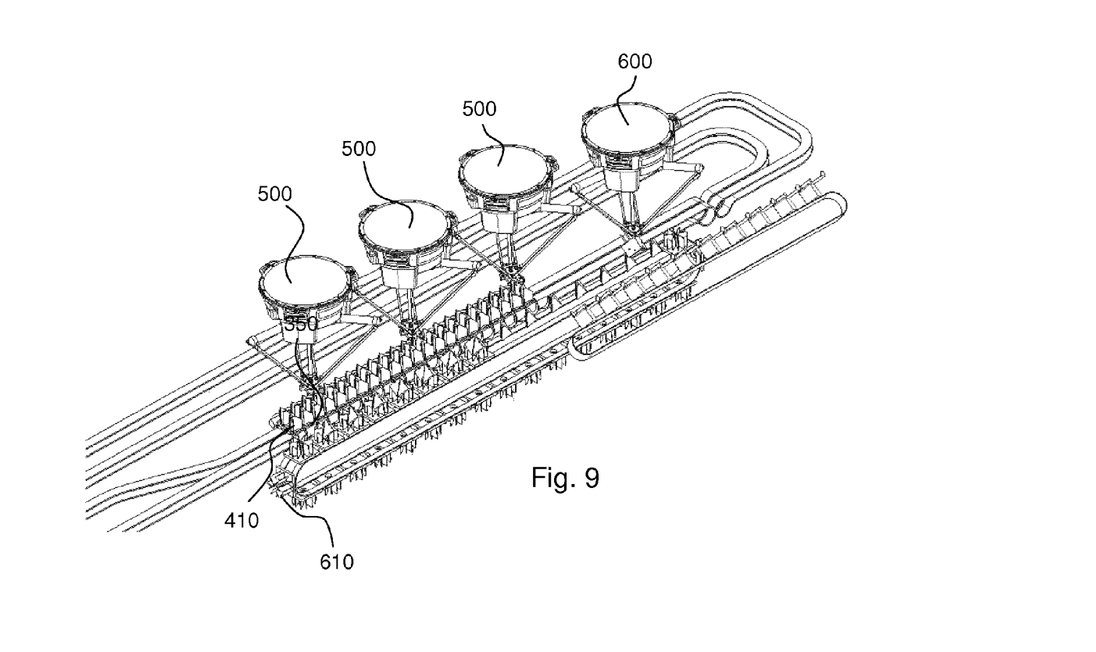
FIG. 9 shows an overall perspective view of a packing station comprising three first robot pickers and one second robot picker.

FIG. 9 shows an overall perspective view of a packing station comprising three first robot pickers 500 and one second robot picker 600. The tetrahedrons arrive at the packing station in the above described first package carrier 410 and are picked two and two by the first robot pickers 500 and placed in a second package carrier 610 to be described below in conjunction with FIG. 13 and FIG. 14.

Figure 10:
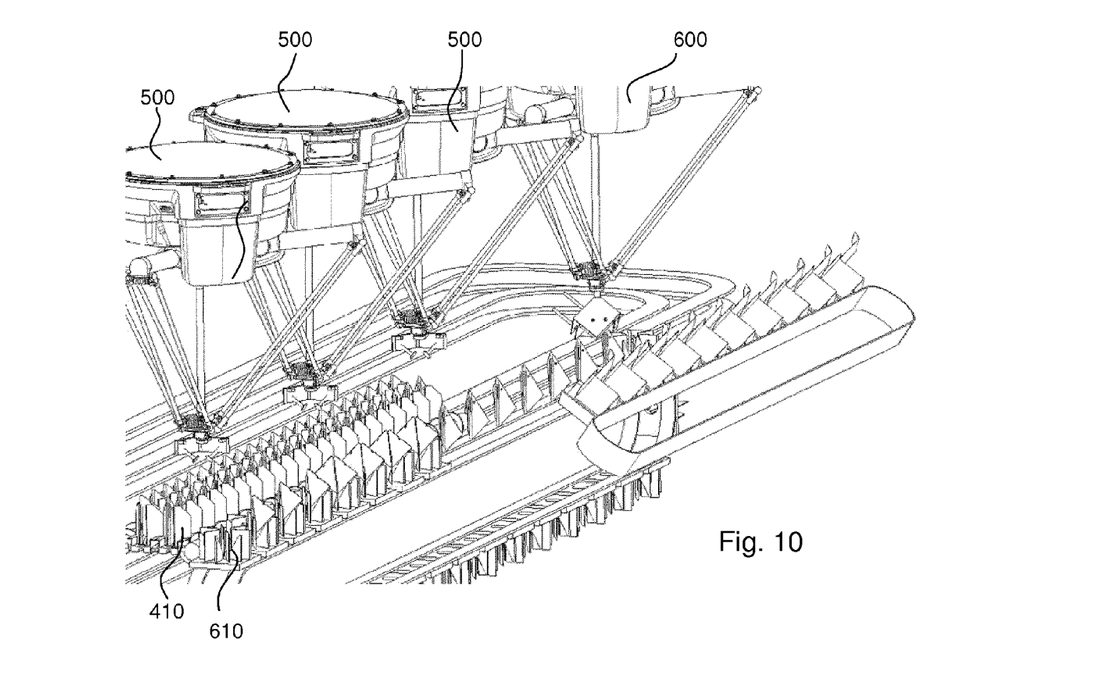
FIG. 10 shows close-up perspective view of the first and second robot pickers.

FIG. 10 shows a close-up perspective view of the first 500 and second 600 robot pickers. The first one of the three robot pickers 500 simultaneously picks two tetrahedrons 1a and 1b, i.e. one of each type of tetrahedron, by means of a lifting device to be described in conjunction with FIG. 11 and FIG. 12. The two different tetrahedral packages 1a and 1b will be placed in the second package carrier 610. The second one of the three robot pickers 500 will also pick two different types of tetrahedrons 1a and 1b simultaneously by means of the lifting device and place them in same second package carrier 610 as the first two tetrahedral packages. The third one of the three robot pickers 500 will repeat the process and will pick and place two different tetrahedral packages in the same second package carrier 610 as the four tetrahedral packages that already have been placed there. There are now six tetrahedral packages in the second package carrier 610, which have been placed in the second package carrier 610 in such away that they constitute a cube 700 (see FIG. 17). The second robot picker 600 then lifts all six tetrahedral packages and places them in a secondary package 800 (see FIG. 17) by means of a second lifting device to be described in conjunction with FIG. 15 and FIG. 16. The second package carriers 610 are transported on a separate conveyor means 605, and the secondary packages 800 are transported on another separate conveyor means 810.

Figure 11:
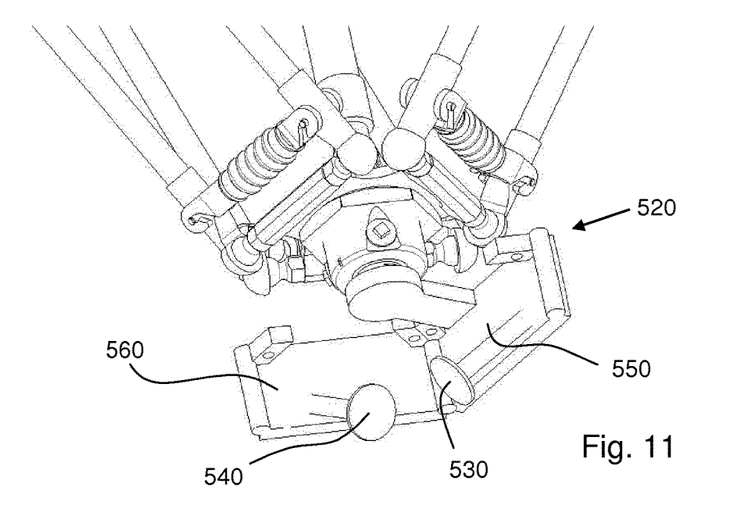
FIG. 11 shows a perspective view of a first lifting device.
Figure 12:
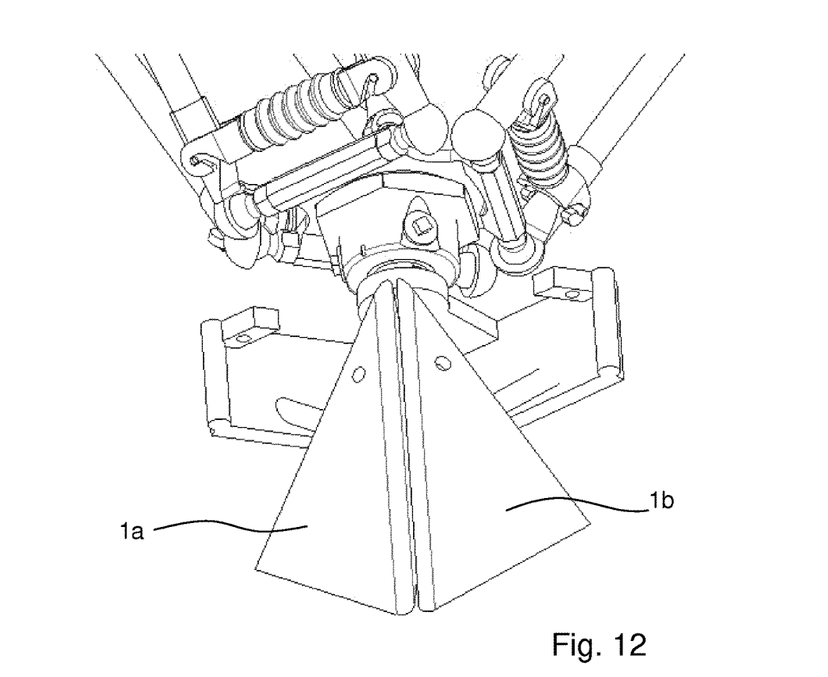
FIG. 12 shows a perspective view of the first lifting device when it is holding two different irregular tetrahedrons

FIG. 11 shows a perspective view of a first lifting device 520 and FIG. 12 shows a perspective view of the first lifting device 520 when it is holding two different irregular tetrahedrons. The first lifting device comprises a first side wall 550 and a second side wall 560. Each side wall 550, 560 comprises a suction device 530 and 540 respectively. The suction devices 530 and 540 are articulated fixed to the first and second side wall 550 and 560. The articulated fixing makes it possible for the lifting device 520 to lift tetrahedron having different sizes. In FIG. 12 it is shown how the lifting device 520 holds two different tetrahedral packages 1a and 1b.

Figure 14:
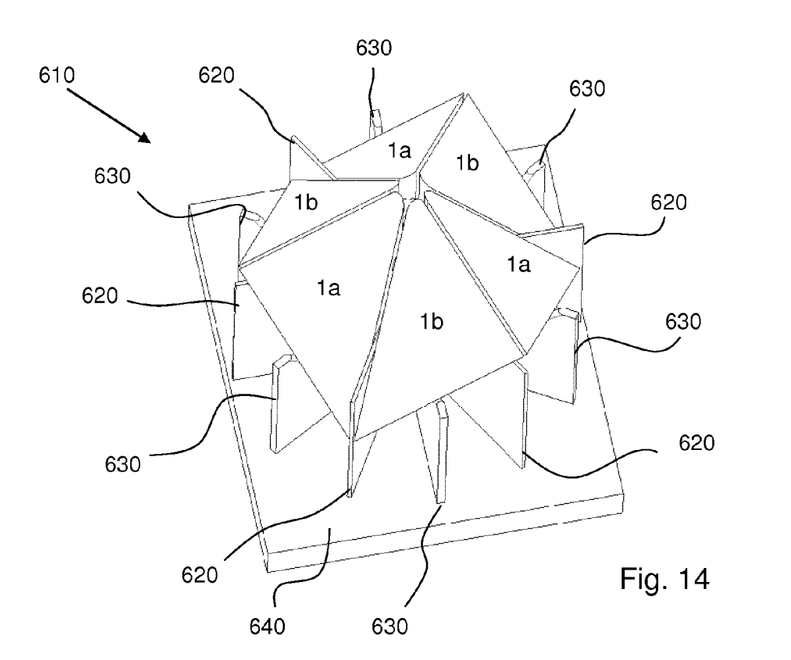

FIG. 13 and FIG. 14 show a perspective view of a second package carrier 610. In FIG. 13 the second package carrier 610 is filled with four irregular tetrahedrons 1a, 1b and in FIG. 14 it is completely filled with irregular tetrahedrons, i.e. six irregular tetrahedrons. The second package carrier 610 comprises a second base plate 640 and six side supports 620 projecting approximately 90° from the second base plate 640 as seen from above. The six side supports 620 of the second package carrier 610 are arranged equidistantly distributed in a fan shaped manner seen from above in a direction of 90° from said the base plate 640. In this manner two adjacent side supports 620 will form a V-shape, which V-shape is open in the bottom region of the V-shape. The second package carrier 610 also comprises intermediate side supports 630 that are placed in the middle between two adjacent side supports 620. The intermediate side supports 630 are tapered in a similar fashion as the third side support 418 of the first package carrier 410, i.e. such that the side closest to the bottom of the V-shape is lower than the side closest to the top of the V-shape. In this way the second package carrier is adapted to receive six tetrahedral packages 1a, 1b in such away that they are grouped together to form a cube 700 when placed in the second package carrier 610. The second base plate 640 has a through going opening 641 centrally arranged with regard to the six side supports 620. The opening is circular and the side supports extend from the opening and outwards. The inner end of each side support 620 extends perpendicular to a tangent of the opening 641.

The packages are loaded into the second package carrier such that the common axis a is arranged perpendicular to the plate 640 and centred in the opening 641 of the plate 640. The isosceles right triangle panels 6, 6' will bear against the intermediate side supports 630. Further, at least portions of the elongated right triangle panels 7, 7', 8, 8' will be supported by the side supports 620. The packages 1a, 1b will be supported in that the sealed fin 2 and a portion of the elongated right triangle panel 7, 7' will bear against a side support 620. A portion of the elongated right triangle panel 8, 8' will bear against an adjacent side support 620. In particular, each V-shape is adapted to accommodate one package 1a, 1b such that one of the side supports 620 of the V-shape supports at least a portion of the first right triangle panel 7, 7' of the package 1a, 1b and the other side support 620 of the V-shape supports at least a portion of the second right triangle panel 8, 8' of the package 620. Further, every second V-shape is adapted to accommodate a first package 1a, and remaining V-shapes are adapted to accommodate a second, mirrored package 1b, such that two adjacent V-shapes are adapted to accommodate a pair of mirrored packages 1a, 1b.

Figure 15:
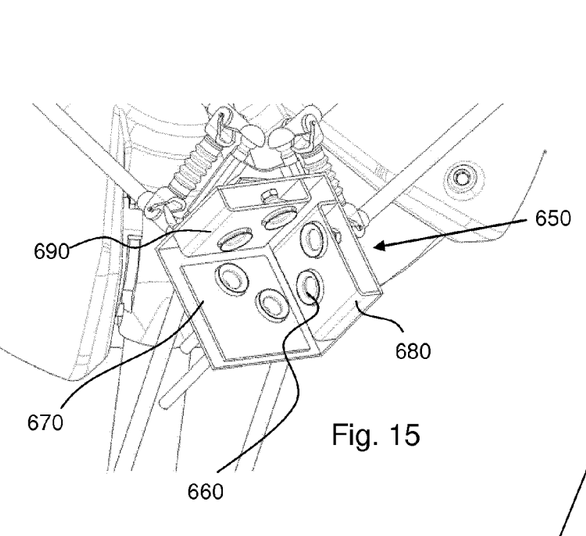
FIG. 15 shows a perspective view of a second lifting device.
Figure 16:
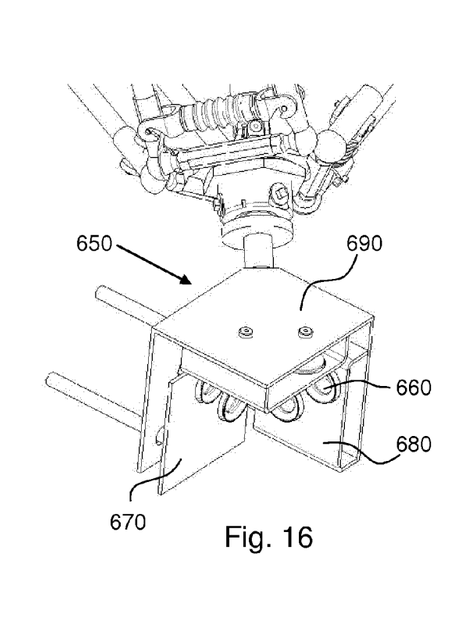
FIG. 16 shows another perspective view of the second lifting device.

Said fan shape is adapted to receive the cube of packages such that the hypotenuses 10, 10' of the packages are aligned towards the axis a arranged in the centre of the fan shape. The axis a extends in a direction perpendicular to the second base plate 640. Turning now to FIG. 15 and FIG. 16 the second lifting device 650 will be described. The second lifting device is built-up in a similar way as the first lifting device 520, but adapted to lift six irregular tetrahedral packages 1a and 1b, i.e. a cube 700, instead of two as with the first lifting device 520. The second lifting device 650 comprises a first a first side wall 670, a second side wall 680 and a third side wall 690. The side walls 670, 680 and 690 comprise two suction devices 660 each. The suction devices 660 are adapted to lifting a cube comprising six tetrahedrons, i.e. there is a suction device 660 for each tetrahedron that the cube exists of. The first side wall 670 is moveable, through some actuator, such that the entire group of packages 1a, 1b can be pushed into the secondary box 800. This typically takes place once the group of packages is partly inserted in the box 800 and the suction devices have been deactivated.

FIG. 17 shows how six tetrahedral packages are grouped together such that they create a cube. FIG. 17 also shows a secondary package 800 into which the cube 700 may be put.

The packing system of the present invention has been described in connection with irregular, mirrored tetrahedral packages. It is of course evident to a person skilled in the art that also regular tetrahedral packages, such as sold under the trademark Tetra Classic®, could be packed using a similar system and method, and with only minor modifications to certain parts.

Thus, the present invention has been described by way of different exemplary embodiments. It should further be noted that the word "comprising" does not necessarily exclude the presence of other elements or steps than those listed and the words "a" or "an" preceding an element do not exclude the presence of a plurality of such elements. It should further be noted that any reference signs do not limit the scope of the example embodiments, that the example embodiments may be implemented at least in part by means of both hardware and software.

The invention claimed is:

1. A system for packing a flow of a first type and a second type of mirrored, irregular tetrahedral packages, each package has two sealed fins, two isosceles right triangle panels and two elongated right triangle panels, where said two isosceles right triangle panels share a leg, and said two elongated right triangle panels share a hypotenuse, said system comprising:
    a divider being configured to divide the tetrahedral packages into two simultaneous flows based on the package being the first type or the second type of tetrahedral package,
    a conveyor for transporting the tetrahedral packages to a packing station,
    a first package carrier being configured to carry either a first type tetrahedral package or a second type tetrahedral package on said conveyor,
    a packing station comprising:
    a first robot picker having a first lifting device adapted to simultaneously transport the two different types of tetrahedral packages, and
    a second package carrier being adapted to receive three pairs of mirrored, irregular tetrahedral packages in such a way that they are grouped together by aligning the hypotenuses of the tetrahedral packages to form a cube when placed in the second package carrier;
    wherein the first package carrier comprises a first base plate and three side supports projecting approximately 90° from said first base plate and being adapted to support both the first and second types of tetrahedral packages; and
    wherein a first and a second side support of the three side supports are arranged such that they form a V-shape seen from above in a direction of 90° from said first base plate, which V-shape is open in a bottom region of the V-shape, a third side support is placed in the middle between the first and second side support and wherein a supporting bar is arranged parallel to the first base plate and connects to all three side supports in an upper region of said V-shape.

2. The system according to claim 1, further comprising a second robot picker having a second lifting device adapted to simultaneously lift six grouped together tetrahedral packages.

3. The system according to claim 1, wherein the second package carrier comprises a planar second base plate and six side supports projecting approximately 90° from said second base plate, and wherein the six side supports are adapted to support at least portions of the elongated right triangle panels of the packages.

4. The system according to claim 1, wherein the conveyor has a V-shaped form, in which the bottom of the V-shaped form has an opening and the system further comprises a straw application machine having a straw applicator for fastening a straw onto the tetrahedral packages from below the V-shaped conveyer through the opening.

5. The system according to claim 1, wherein the third side support is tapered, such that a side closest to the bottom of the V-shape is lower than a side closest to the top of the V-shape.

6. The system according to claim 3, wherein the six side supports of the second package carrier are equidistantly distributed in a fan shape seen from above in a direction of 90° from said second base plate, such that two adjacent side supports form a V-shape, which V-shape is open in the bottom region of the V-shape at a centre of the fan shape, and wherein said fan shape is adapted to receive the cube of packages such that the hypotenuses of the packages are aligned towards an axis arranged in the centre of the fan shape and which axis extends in a direction perpendicular to the second base plate.

7. The system according to claim 6, wherein each V-shape is adapted to accommodate a package such that one of the side supports of the V-shape supports at least a portion of a first right triangle panel of the package and another side support of the V-shape supports at least a portion of a second right triangle panel of the package.

8. The system according to claim 6, wherein intermediate side supports are placed in the middle between two adjacent side supports, said intermediate side support being tapered, such that the side closest to the bottom of the V-shape is lower than the side closest to the top of the V-shape, and wherein each intermediate side support being adapted to support one of the isosceles right triangle panels.

9. The system according to claim 6, wherein every second V-shape is adapted to accommodate a first package, and remaining V-shapes are adapted to accommodate a second, mirrored package, such that two adjacent V-shapes are adapted to accommodate a pair of mirrored packages.

10. A packaging line comprising the system according to claim 1 and a filling machine for producing mirrored, irregular tetrahedral packages.

* * * * *